(12) United States Patent
Li et al.

(10) Patent No.: US 12,379,952 B2
(45) Date of Patent: Aug. 5, 2025

(54) HIGH THROUGHPUT INGRESS DATAPATH FOR A VIRTUAL MACHINE

(71) Applicant: VMware LLC, Palo Alto, CA (US)

(72) Inventors: Peng Li, Fremont, CA (US); Ronak Doshi, San Jose, CA (US); Guolin Yang, San Jose, CA (US); Boon S. Ang, Saratoga, CA (US)

(73) Assignee: VMware LLC, Palo Alto, CA (US)

( * ) Notice: Subject to any disclaimer, the term of this patent is extended or adjusted under 35 U.S.C. 154(b) by 513 days.

(21) Appl. No.: 17/860,040

(22) Filed: Jul. 7, 2022

(65) Prior Publication Data

US 2023/0018548 A1   Jan. 19, 2023

Related U.S. Application Data

(60) Provisional application No. 63/221,356, filed on Jul. 13, 2021.

(51) Int. Cl.
*G06F 9/455* (2018.01)
(52) U.S. Cl.
CPC ............ *G06F 9/45558* (2013.01); *G06F 2009/45583* (2013.01); *G06F 2009/45595* (2013.01)
(58) Field of Classification Search
CPC .................................. G06F 9/45558
USPC ............................................... 718/1
See application file for complete search history.

(56) References Cited

U.S. PATENT DOCUMENTS

| | | | | |
|---|---|---|---|---|
| 7,746,783 B1* | 6/2010 | Tripathi | ............ | H04L 49/9047 718/1 |
| 8,683,000 B1* | 3/2014 | Schlansker | ............ | H04L 47/39 709/212 |
| 2008/0002714 A1* | 1/2008 | Belgaied | ............... | H04L 47/10 370/395.21 |
| 2009/0089351 A1* | 4/2009 | Belgaied | ............... | H04L 49/90 709/201 |
| 2009/0219936 A1* | 9/2009 | Tripathi | ................ | H04L 41/00 370/392 |
| 2012/0265910 A1* | 10/2012 | Galles | ............... | G06F 11/2005 710/300 |

(Continued)

OTHER PUBLICATIONS

K. Ueda, T. Kikutani, and T. Yakoh. Parallel implementation of real-time communication and IP communication by using multiple ring buffers. In Proceedings of 2014 10th IEEE Workshop on Factory Communication Systems (WFCS 2014), pp. 1-8, May 2014. (Year: 2014)*

*Primary Examiner* — Mehran Kamran
(74) *Attorney, Agent, or Firm* — Kim & Stewart LLP (57) ABSTRACT

Some embodiments provide a method of forwarding data messages to a machine that executes on a host computer and has an associated virtual network interface controller (VNIC) also executing on the host computer. The method retrieves data messages from a queue associated with the VNIC and stores these data messages in a first set of buffer data stores associated with the VNIC. When the first buffer set reaches a threshold congestion level, the method stores data messages subsequently retrieved from the VNIC queue in a second set of buffer data stores associated with the VNIC. In some embodiments, a set of one or more processes executing on the machine retrieves the data messages stored in the buffer sets for processing by these processes or other processes.

18 Claims, 7 Drawing Sheets

(56) References Cited

U.S. PATENT DOCUMENTS

| | | | |
|---|---|---|---|
| 2013/0145072 A1* | 6/2013 | Venkataraghavan ... | H04L 49/00 710/316 |
| 2015/0381505 A1* | 12/2015 | Sundararaman ........ | H04L 47/25 370/235 |
| 2016/0182342 A1* | 6/2016 | Singaravelu ............ | H04L 43/20 370/253 |
| 2017/0149694 A1* | 5/2017 | Lakshmanan ....... | H04L 49/3045 |
| 2018/0006923 A1* | 1/2018 | Gao ........................ | H04L 43/12 |
| 2018/0101494 A1* | 4/2018 | Davis .................... | G06F 13/105 |
| 2018/0307520 A1* | 10/2018 | Hyoudou ............ | G06F 9/45558 |
| 2019/0306088 A1* | 10/2019 | Chilikin .............. | H04L 47/2441 |
| 2020/0177516 A1* | 6/2020 | Thorstensen ......... | H04L 47/365 |
| 2021/0089343 A1* | 3/2021 | Hyoudou .............. | G06F 9/5016 |
| 2023/0018548 A1* | 1/2023 | Li ....................... | G06F 9/45558 |
| 2024/0039803 A1* | 2/2024 | Li .......................... | H04L 41/50 |

* cited by examiner

HIGH THROUGHPUT INGRESS DATAPATH FOR A VIRTUAL MACHINE

CLAIM OF BENEFIT TO PRIOR APPLICATION

This application claims the benefit of U.S. Provisional Patent Application 63/221,356, filed Jul. 13, 2021. U.S. Provisional Patent Application 63/221,356 is incorporated herein by reference.

BACKGROUND

Storage rings are circular queue implementations of a fixed size that store data messages. Virtual machines (VMs) use storage rings to alleviate bursts of traffic that require processing. When storing data messages, storage rings use a first in first out fashion such that the first data message stored in the storage ring will be the first data message taken out. Storage rings can exist on both the receive (Rx) and transmit (Tx) side. For instance, a virtual network interface controller (VNIC) stores data messages in Rx storage rings until a set of processes retrieves the data messages for processing.

However, the fixed size of storage rings causes limitations when storage rings are used in VMs as data message queues. A set of processes is only capable of retrieving so many data messages from storage rings at a time, so the storage rings can become full if more data messages are being stored than retrieved. When the VNIC receives a large burst of data messages and the storage rings start to fill up, the VNIC is unable to store all of the data messages in the storage rings. In consequence, the VNIC drops data messages that are unable to be stored in any of the storage rings.

Currently, the solution to this problem is to increase the size of the storage rings. For instance, a storage ring of size 256 can be increased to size 512 so it can store a larger amount of data messages than it could previously. This solves the problem and the storage rings are now able to handle more traffic. However, increasing the size of storage rings also increases the memory footprint and the memory consumption. A VM using these larger storage rings uses more memory as its running, degrading the performance of the VM. While the current solution to dropping data messages is functional, it is not practical. Hence, another solution that does not increase memory footprint or consumption is required.

BRIEF SUMMARY

Some embodiments provide a novel method of forwarding data messages to a machine (e.g., a virtual machine (VM), container, Pod) that executes on a host computer and has an associated virtual network interface controller (VNIC) that also executes on the host computer. The method retrieves data messages from a queue associated with the VNIC and stores these data messages in a first set of buffer data stores (e.g., in a first storage ring) associated with the VNIC. When the first buffer set reaches a threshold congestion level, the method then stores data messages subsequently retrieved from the VNIC queue in a second set of buffer data stores associated with the VNIC queue. In some embodiments, the first and second buffer sets are the same size. In some embodiments, a set of one or more processes executing on the machine (e.g., processes of applications or an operating system executing on the machine) retrieves the data messages stored in the first or second buffer set for processing by these processes or other processes.

To perform the above-described operations, the method of some embodiments initially designates the first buffer set as the active buffer set and the second buffer set as the standby buffer set, so that an initial, first set of data messages is stored in the active first buffer set. Subsequently, the method of some embodiments designates the second buffer set as the active buffer set and the first buffer set as the standby buffer set, so that a subsequent, second set of data messages is stored in the active second buffer set. In some embodiments, each set of buffer data stores is implemented as a storage ring (e.g., a circular buffer of storage elements that stores values on a first in, first out basis, with the first storage element being used again after the last storage element is used to store a value). Using an active/standby configuration of storage rings provides for a high throughput ingress datapath for data messages. In the discussion below, storage rings are also referred to as rings, ring buffers, and circular buffers.

The threshold congestion level at which the first buffer set becomes the standby buffer set and the second buffer set becomes the active buffer set is a first threshold congestion level. After this switch, the method stores the second set of data messages retrieved from the VNIC queue to the second buffer set for a duration of time, until it detects that the second buffer set has reached a second threshold congestion level. Once this threshold is reached, the method changes the designation of the first and second buffer sets, this time making the first buffer set the active buffer set again while designating the second buffer set as the standby buffer set. In some embodiments, the first and second threshold congestion levels are the same, while in other embodiments, they can be different.

Even after switching the designation of the first and second buffer sets, the set of processes that retrieves data messages from the buffer sets continue retrieving data messages from the newly designated standby buffer set (i.e., from the previously designated active buffer set) until all the data messages have been retrieved from this buffer set, before starting to retrieve data messages from the newly designated active buffer set (i.e., from the previously designated standby buffer set). In some embodiments, the set of processes stores default null values in the buffers after retrieving data messages from these buffers so that the process set can subsequently detect that it has retrieved all the data messages stored in the buffers. Alternatively, or conjunctively, the set of processes in some embodiments toggle a flag associated with each buffer that designates whether the buffer stores a data message for retrieval or stores no data message for retrieval. Other embodiments employ still other techniques.

In some embodiments, the VNIC has multiple queues, and for each queue, the method of some embodiments employs an active/standby pair of buffer sets, as described above. Also, the method of some embodiments uses a monitoring process to monitor the congestion level of each active buffer set in an active/standby pair, and changes the designation of the buffer sets in each pair when the active buffer set reaches a threshold congestion level. The monitor may store these designations in a data store. These designations are then used by data fetchers that are instantiated for retrieving data messages from each VNIC queue and storing the data messages in the active buffer set of the VNIC queue. In other embodiments, the monitors provide these designations to the data fetchers through other mechanism (e.g., through function calls).

The data messages that are stored in the VNIC queues are data messages that are passed to the VNIC from a port of a software switch (also called a virtual switch) executing on the host computer. In some embodiments, the software switch port is conceptually connected to (i.e., associated with) the VNIC of the machine. The VNIC can store the data messages provided by its software switch port in any one of its queues.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method of forwarding data messages to a machine (e.g., a virtual machine (VM), container, Pod) that executes on a host computer and has an associated virtual network interface controller (VNIC) that also executes on the host computer. The method retrieves data messages from a queue associated with the VNIC and stores these data messages in a first set of buffer data stores (e.g., in a first storage ring) associated with the VNIC queue. When the first buffer set reaches a first threshold congestion level, the method then stores data messages subsequently retrieved from the VNIC queue in a second set of buffer data stores associated with the VNIC queue. In some embodiments, the first and second buffer sets are the same size. In some embodiments, a set of one or more processes executing on the machine (e.g., processes of applications or an operating system executing on the machine) retrieves the data messages stored in the first or second buffer set for processing by these processes or other processes.

To perform the above-described operations, the method of some embodiments initially designates the first buffer set as the active buffer set and the second buffer set as the standby buffer set, so that an initial, first set of data messages is stored in the active first buffer set. Subsequently, the method of some embodiments designates the second buffer set as the active buffer set and the first buffer set as the standby buffer set, so that a subsequent, second set of data messages is stored in the active second buffer set. In some embodiments, the VNIC has multiple queues, and for each queue, the method of some embodiments employs an active/standby pair of buffer sets, as described above.

After this switch, the method stores a third set of data messages retrieved from the VNIC queue in the second buffer set for a duration of time, until it detects that the second buffer set has reached a second threshold congestion level. Once this threshold is reached, the method changes the designation of the first and second buffer sets, this time making the first buffer set the active buffer set again while designating the second buffer set as the standby buffer set. In some embodiments, the first and second threshold congestion levels are the same, while in other embodiments, they can be different. Even after switching the designation of the first and second buffer sets, the set of processes that retrieve data messages from the buffer sets continue retrieving data messages from the newly designated standby buffer set (i.e., from the previously designated active buffer set) until all the data messages have been retrieved from this buffer set, before starting to retrieve data messages from the newly designated active buffer set (i.e., from the previously designated standby buffer set).

In some embodiments, the active/standby buffer sets for each VNIC queue are implemented as a pair of active/standby storage rings. A storage ring, in some embodiments, is a circular buffer of storage elements that stores values on a first in, first out basis, with the first storage element being used again after the last storage element is used to store a value. The storage elements of a storage ring are locations in a memory (e.g., a volatile memory or a non-volatile memory of storage). Both the VNIC queues and the storage rings are used as holding areas for data messages so processes that need to process these data messages can handle large amounts of traffic. Using an active/standby configuration of storage rings provides for a high throughput ingress datapath for data messages. In the discussion below, storage rings are also referred to as rings, ring buffers, and circular buffers.

Figure 1:
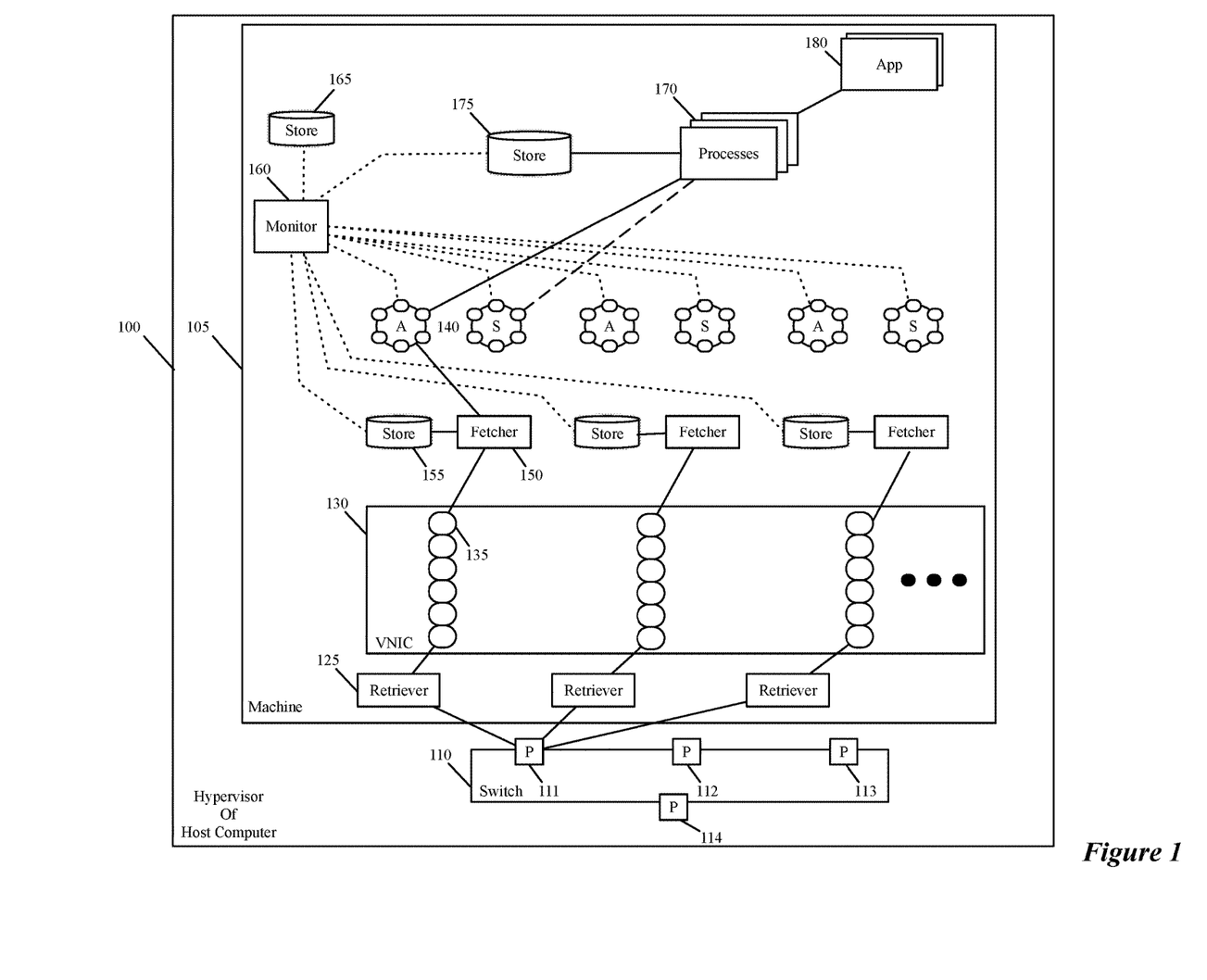
FIG. 1 illustrates a hypervisor of a host computer comprising a software switch and a machine that perform methods of some embodiments to forward data messages to the machine.

One example of such active/standby rings is illustrated in FIG. 1. This figure presents a hypervisor of a host computer 100 that implements the method of some embodiments. Executing on the hypervisor 100 is a software switch 110 with ports 111, 112, 113, and 114. Also executing on the hypervisor 100 is a machine 105 comprising retrievers 125, a VNIC 130 with VNIC queues 135, pairs of active and standby rings 140, data fetchers 150, a monitor 160, a set of one or more processes 170, a set of one or more applications 180, and data stores 155, 165, and 175.

The port 111 enables the transfer of data messages between the software switch 110 and the machine 105. For instance, data messages are sent from port 111 to multiple queues 135 associated with the VNIC 130. The number N of queues 135 varies in different embodiments. Data messages are sent from the port 111 to the VNIC queues 135 using the retrievers 125. The number N of retrievers 125, in some embodiments, is the same number N of queues 135 as each queue is associated with a different retriever. Other embodiments, however, may have a single retriever associated with all ports of a switch and all queues of a VNIC.

In some embodiments, each VNIC queue 135 is associated with its own data fetcher 150, data store 155, and pair of active and standby rings 140. As such, in these embodiments, the numbers N of ring pairs 140, data fetchers 150, and associated data stores 155 match the number N of VNIC queues 135. In some embodiments, the rings in each ring pair 140 are the same size. For instance, each ring in each ring pair 140 is shown as having 6 storage elements. The data fetcher 150 retrieves data messages from the VNIC queue 135 and stores them in the active ring of the ring pair 140. In some embodiments, the data fetcher 150 identifies the active ring in its associated ring pair by using the data store 155, which is updated by the monitor 160. In other embodiments, the monitor 160 provides this information (i.e., provides data identifying the active ring and/or standby ring) to the data fetcher 150 through a function call, and the data fetcher 150 stores the information in the data store 155. In other embodiments, the monitor 160 stores this information in the data store 165 for use by both the data fetcher 150 and the set of processes 170.

The set of processes 170 retrieves the data messages from each ring pair 140 to process the data messages. Usually, the set of processes 170 retrieves data messages from the active ring in the ring pair. For instance, the set of processes 170 retrieves data messages from the active ring in the ring pair 140, as denoted by a solid line, but may also retrieve data messages from the standby ring in the ring pair 140, as denoted by a dashed line. In some embodiments, after a switch of the active/standby designation of the ring pair 140 (i.e., the active ring becomes the new standby ring and the standby ring becomes the new active ring), the set of processes 170 continues to retrieve data messages from the new standby ring until that ring is completely empty. In some embodiments, only once the new standby ring is completely empty does the set of processes 170 begin retrieving data messages from the new active ring. In some embodiments, the set of processes 170 uses the data store 175 to determine which ring in the ring pair 140 is active and which is standby. The monitor 160 updates the data store 175 when the ring pair 140 switches its active/standby designation. Alternatively, in some embodiments, the monitor 160 provides this information (i.e., provides data identifying the active ring and/or standby ring) to the set of processes 170 through a function call, and the set of processes 170 stores the information in the data store 175. In other embodiments, the monitor 160 stores this information in the data store 165 for use by both the set of processes 170 and the data fetcher 150.

In some embodiments, the set of processes 170 can be part of a set of one or more applications 180. In other embodiments, the set of processes 170 can be part of the operating system (OS) and handoff data messages to the set of applications 180 for processing. In some embodiments, the set of processes 170 includes only one process that retrieves data messages from one active/standby ring pair 140 associated with one VNIC queue 135. That is, the set of processes 170 includes one process for each ring pair 140 and its associated VNIC queue 135. In other embodiments, multiple processes from the set of processes 170 retrieve data messages from a particular ring pair 140 associated with a particular VNIC queue 135.

In some embodiments, the monitor 160 monitors the congestion levels of each ring in each ring pair 140. The monitor 160 may monitor the level of storage taken up by data messages stored in the active ring of the ring pair 140 by keeping a count of empty and/or full storage elements of the active ring. In some embodiments, the count is kept by the ring pair 140, and the monitor 160 monitors that count in order to detect a threshold congestion level being reached. Once that count reaches the threshold congestion level, the monitor detects that the ring pair needs to switch its active and standby designation in order for the ring pair 140 to continue storing data messages from the data fetcher 150. The threshold congestion level of the active ring may, in some embodiments, be the maximum storage capacity of the ring or may be a different specified amount. After the monitor 160 detects that the ring pair 140 must switch its active/standby designation, the monitor 160 modifies the appropriate data stores 155, 165, and/or 175 for use by the data fetcher 150 and set of processes 170.

Figure 2:
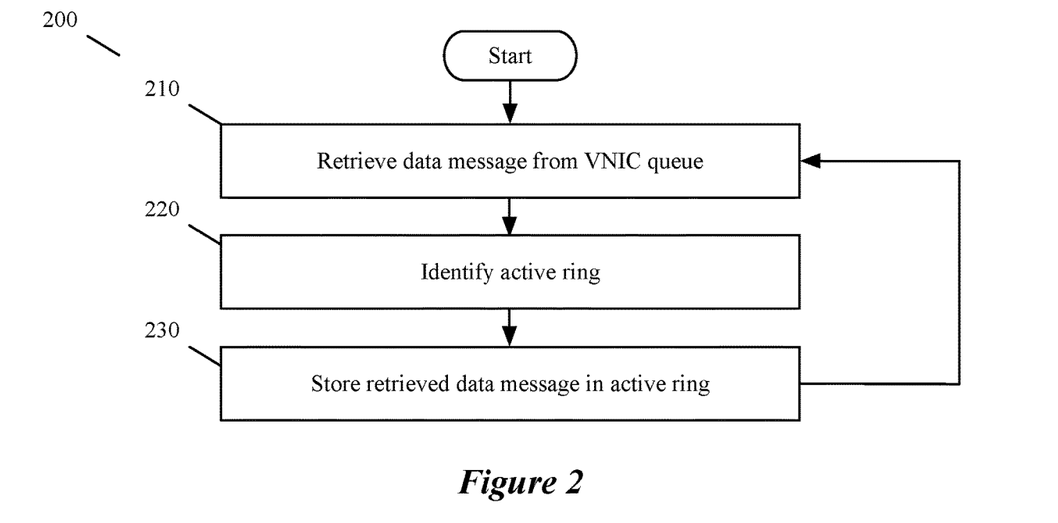
FIG. 2 illustrates a process that the data fetcher performs in some embodiments.

FIG. 2 conceptually illustrates a process 200 performed to forward data messages from a VNIC queue on a machine of a host computer to a storage ring of an active/standby ring pair also on the machine. In some embodiments, the data fetcher 150 performs the process 200 iteratively to pass along the data messages from its associated VNIC queue to the ring that is currently designated as the active ring for this queue. In other embodiments, another module executing on the host computer performs the process 200.

The process starts by retrieving (at 210) a data message from the VNIC queue. In some embodiments, the data message is stored in the VNIC queue after being sent from a software switch on the hypervisor of the host computer. The VNIC queue, in some embodiments, is associated with one data fetcher and one active/standby ring pair. It is the data fetcher's responsibility to retrieve data messages from its associated VNIC queue and store them in the ring currently designated as the active ring for this queue. In some embodiments, the data fetcher continuously checks the last location of the VNIC queue to retrieve the data message from the last location of the VNIC queue. In other embodiments, the data fetcher is called upon each time a new data message is stored at the VNIC queue's last location to retrieve the data message.

The process then identifies (at 220) the active ring in the ring pair associated with the VNIC queue from which the data message was retrieved. In some embodiments, the data fetcher monitors the rings in the ring pair to determine which ring is the active ring. In other embodiments, the data fetcher checks the data store 155 or the data store 165, which is updated by the monitor 160. In other embodiments, operation 220 is performed by receiving a function call from the monitor that monitors the rings in the ring pair to designate which ring is active. Other methods of identifying which ring is designated as the active ring will be understood by a person of ordinary skill in the art.

The process then stores (at 230) the retrieved data message in the active ring of the ring pair. This operation 230 may be performed by storing the data message in a storage element of the active ring. A ring comprises a plurality of storage elements, or storage locations, that are in a particular sequential order. Each storage element has a prior storage location and a subsequent storage element that precedes it and follows it in a sequential order. A ring has a circular structure because the last storage element in the sequential order has the first storage element of the ring as its next storage element. That is, the ring comprises a current write position as a slot designated for the next write operation, and a current read position as a slot currently designated for reading.

After 230, the process 200 returns to 210 to retrieve the next data message from the associated VNIC queue. This is because in some embodiments, the process 200 iterates through 210-230 so long as the machine on which the process is being performed is currently running on the host computer.

Figure 3:
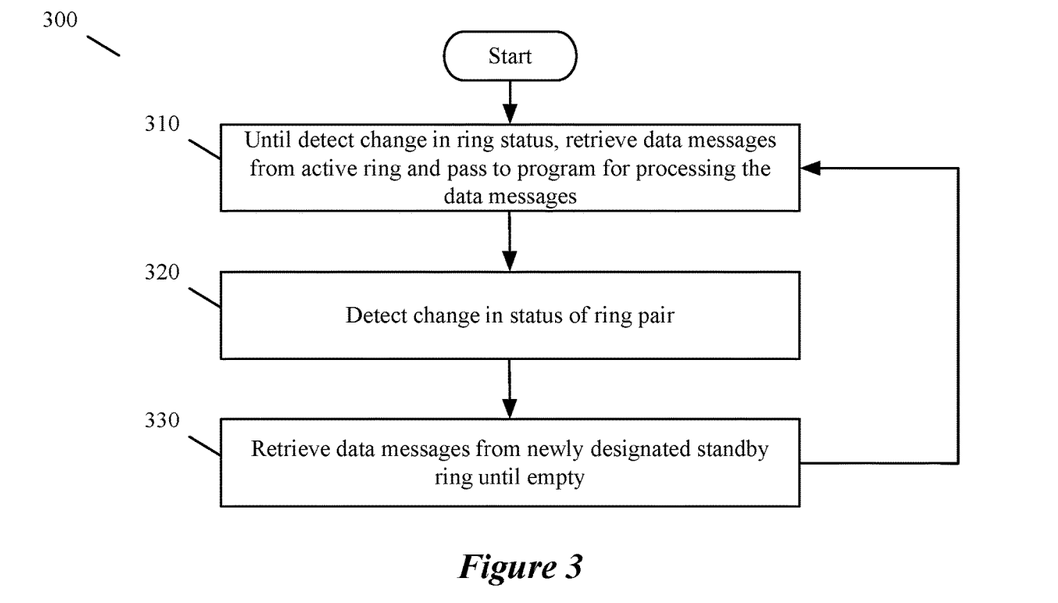
FIG. 3 illustrates a process that the set of one or more processes performs in some embodiments.

FIG. 3 conceptually illustrates a process 300 for retrieving data messages from rings. Specifically, this process retrieves data messages from a ring pair that switches its active/standby designation of its rings. In some embodiments, the set of one or more processes 170 performs the process 300 iteratively to collect data messages from a pair of active and standby rings. In other embodiments, another set of processes or a set of one or more applications executing on the host computer performs the process 300.

Until the process detects a change in ring status of the rings in the ring pair, the process retrieves (at 310) data messages from the designated active ring and passes the data messages to a program for processing the data messages. The program may be, in some embodiments, the set of one or more applications 180. In some embodiments, retrieving the data messages from the active ring includes storing a default null value in the storage element of the ring from which the data message was retrieved.

The process then detects (at 320) a change in status of the rings in the ring pair. Specifically, the process detects that the active ring is now the standby ring and the standby ring is now the active ring. In some embodiments, this step may be performed using the data store 160 or 175, which is updated by the monitor 160. In other embodiments, this step may be performed by receiving a function call from the monitor 160 that monitors the ring pair to designate which ring is active. Methods of monitoring the ring pair will be further discussed below.

The process then retrieves (at 330) data messages from the newly designated standby ring until the ring is empty. That is, the process will continue to retrieve data messages from the previously designated active, now standby, ring until all data messages from that ring are retrieved. The process will not retrieve data messages from the new active ring until the new standby ring is empty. In some embodiments, operation 330 will determine that the new standby ring is empty by detecting default null values in each storage element of the ring.

After 330, the process 300 returns to 310 to retrieve the next data message from the active ring. This is because in some embodiments, the process 300 iterates through 310-330 so long as the machine on which the process is being performed is currently running on the host computer. In some embodiments, the process 300 is performed by a set of processes for a single ring pair. In other embodiments, the set of processes performs the process 300 for multiple ring pairs. Still in other embodiments, the process 300 can be performed for multiple ring pairs, each by a different set of processes.

Figure 4:
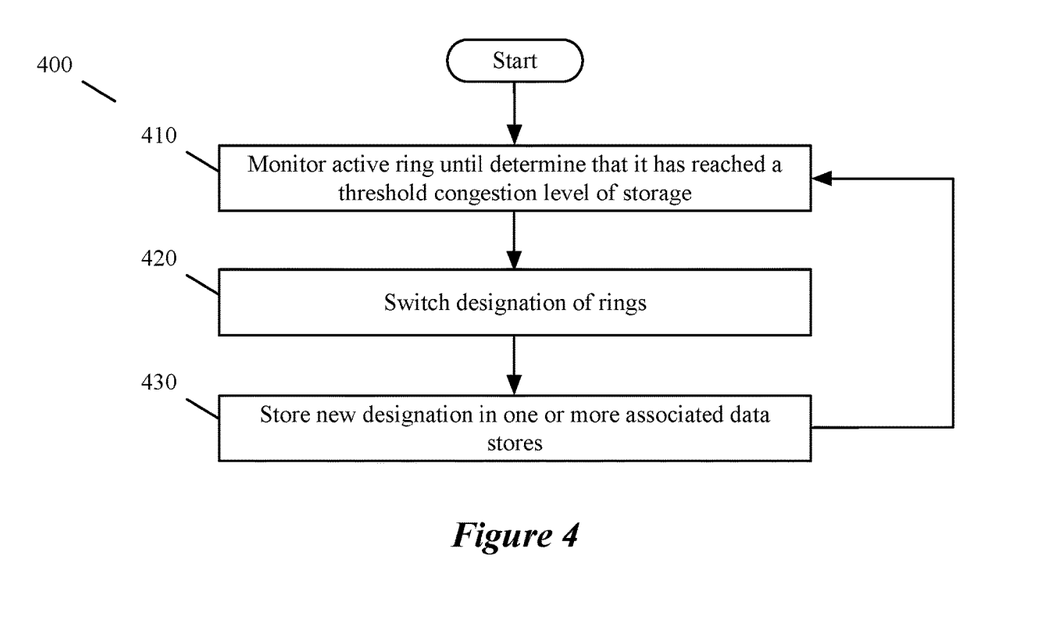
FIG. 4 illustrates a process that the monitor performs in some embodiments.

FIG. 4 conceptually illustrates a process 400 for monitoring active/standby ring pairs. Specifically, the process monitors the congestion levels of each ring in a ring pair in order to designate which ring is active and which ring is standby. In some embodiments, the monitor 160 performs the process 400 to iteratively monitor the active/standby ring pair to update the rings' active and standby designations. In other embodiments, another module executing on the host computer performs the process 400.

The process begins by monitoring (at 410) the designated active ring in a ring pair until it is determined that the active ring has reached a threshold congestion level of storage. At operation 410, the process monitors the level of storage taken up by stored data messages in the active ring and/or the level of storage available to store more data messages in the active ring. In some embodiments, the threshold congestion level of the ring is the maximum storage capacity of the ring, meaning that the ring is unable to store any more data messages. In other embodiments, the threshold congestion level is some other specified amount of storage taken up in the ring.

In some embodiments, the active ring, like all rings, has a fixed number of storage elements to store up to a fixed number of data messages. In some embodiments, operation 410 may be performed by keeping and updating a count of empty storage elements available to store data messages in the active ring. In other embodiments, operation 410 may be performed by keeping and updating a count of filled storage elements in the active ring. The count may be kept either by the monitor or by the ring for the monitor to read. When the count reaches a certain threshold, the monitor is able to determine that the ring has reached a threshold congestion level of storage and that the active/standby designation of the ring pair must be switched.

The process then switches (at 420) the designation of the rings in the ring pair. The monitor switches the designation such that the active ring becomes the newly designated standby ring, and the standby ring becomes the newly designated active ring. The newly designated active ring will now be able to store subsequent data messages while the newly designated standby ring is able to clear out the data messages that it is currently storing.

The process then stores (at 430) the new designation of the rings in one or more associated data stores. In some embodiments, the monitor stores the new designation in the data store 155 for the data fetcher 150 and/or in the data store 175 for the set of processes 170. These data stores are used by the data fetcher and the set of processes respectively to retrieve and store data messages using the correct ring in the ring pair. In other embodiments, the monitor stores the new designation in the data store 165 for both the data fetcher 150 and the set of processes 170 to use. Still in other embodiments, operation 430 can be performed by the data fetcher 150 and the set of processes 170. In such embodiments, the monitor sends the new ring designation to the data fetcher and the set of processes, and the data fetcher stores the information in the data store 155 and the set of processes stores the information in the data store 175.

After 430, the process 400 returns to 410 to monitor the current active ring to determine when it reaches a threshold storage congestion level of storage. This is because in some embodiments, the process 400 iterates through 410-430 so long as the machine on which the process is being performed is currently running on the host computer.

FIGS. 5A-F illustrate a multi-stage process for storing and retrieving data messages from rings in a ring pair on a machine executing on a host computer. In this example, the storage of data messages is performed by a data fetcher 510 and the retrieval of data messages is performed by a set of one or more processes 520.

Figure 5A:
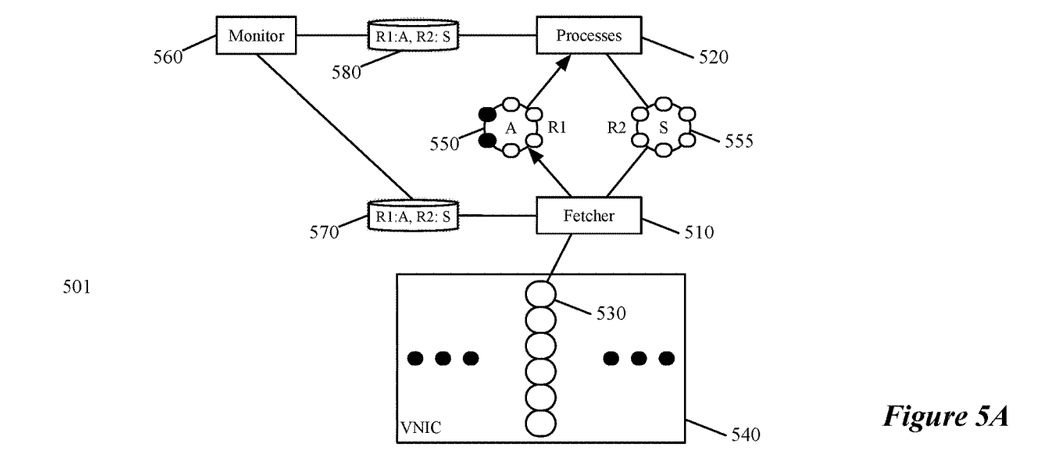
FIGS. 5A-F illustrate a multi-stage data message storage and retrieval process that is performed respectively by the data fetcher and the set of one or more processes in some embodiments.

At the first stage 501 in FIG. 5A, a data fetcher 510 retrieves data messages from a queue 530 of a VNIC 540 and stores them in the storage elements of ring 1 550. In some embodiments, the VNIC 540 has multiple queues, and for each queue, some embodiments employ an active/standby pair of rings, as described above. In some embodiments, the VNIC 540 may store data messages in any of its queues. In this figure, ring 1 550 is shown as having 6 storage elements shown as circles around the rings, two of which are currently storing data messages shown as black circles. Ring 1 550 is storing data messages and ring 2 555 is not because ring 1 550 is designated as the active ring in the ring pair and ring 2 555 is designated as the standby ring in the ring pair. At this stage 501, the data fetcher 510 is not storing any new data messages in ring 2 555.

Also at stage 501, the set of processes 520 is retrieving data messages from the storage elements of ring 1 550 for processing. The set of processes 520 is not retrieving data messages from ring 2 555, which is empty. In some embodiments, the set of processes 520 additionally stores a default null value in each storage element of ring 1 550 after retrieving the data message from the storage element. Alternatively, or conjunctively, the set of processes 520 in some embodiments toggles a flag associated with ring 1 550 that designates whether the ring stores a data message for retrieval or stores no data message for retrieval. Other embodiments employ still other techniques when retrieving data messages from rings. The monitor 560 monitors the rings and designates which is active and which is standby. The monitor 560 may record the designation in data stores 570 and 580. The data store 570 is associated with the data fetcher 510 so the data fetcher knows which ring to store data messages. The data store 580 is associated with the set of processes 520 so the set of processes knows which ring is currently storing new data messages.

Figure 5B:
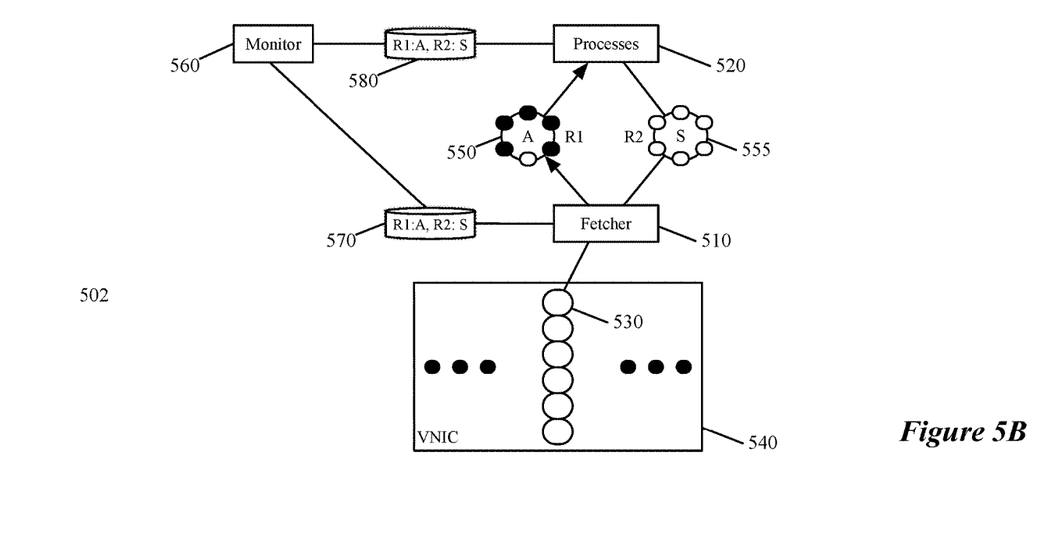

At the second stage 502 in FIG. 5B, ring 1 550 has reached its threshold congestion level. In this example, the threshold congestion level of ring 1 550 is the point at which only one storage element is empty. In other embodiments, the threshold congestion level is different. The data fetcher 510 is now unable to store more data messages from the VNIC queue 530 in ring 1 550 without causing the ring to exceed its threshold congestion level. The set of processes 520 is still retrieving data messages from ring 1 550. While the monitor has detected that ring 1 550 has reached its threshold congestion level, it has not yet updated the data stores 570 and 580. Hence, Ring 2 555 is not storing data messages from the data fetcher 510 at stage 502.

Figure 5C:
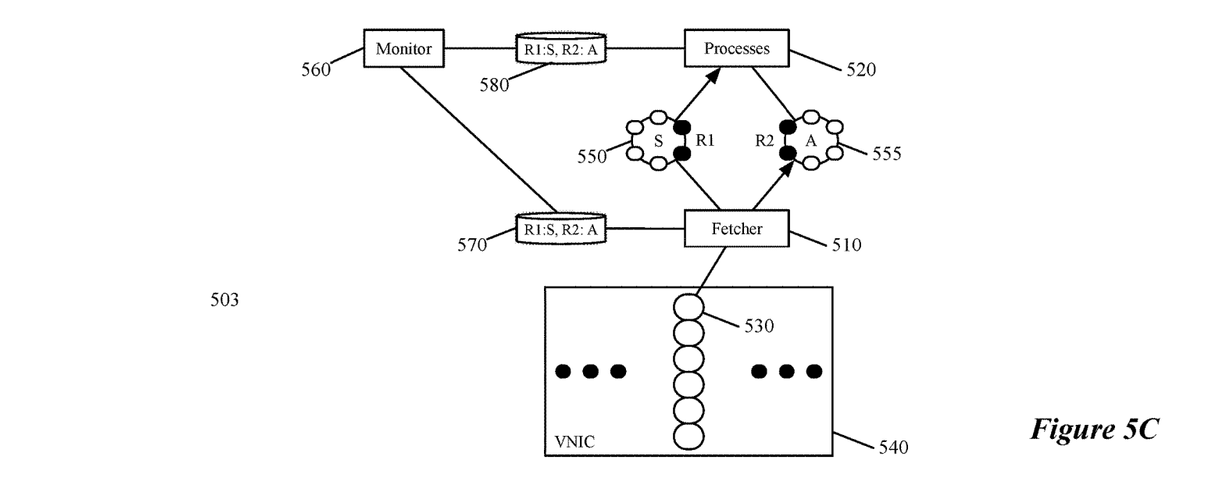

At the next stage 503 in FIG. 5C, ring 1 550 is now designated as the standby ring and ring 2 555 is now designated as the active ring. The monitor 560 has recorded the new designation of the rings in the data stores 570 and 580. The data fetcher 510 notices the new designation of the rings from the data store 570 and is now storing data messages from the VNIC queue 530 in ring 2 555. The set of processes 520 notices the new designation of the rings from the data store 580 but does not start retrieving data messages from ring 2 555. At this stage, ring 1 550 is currently storing data messages in two of its storage elements. The set of processes 520 will not start retrieving data messages from ring 2 555 until ring 1 550 is empty, so the set of processes 520 continues to retrieve data messages from ring 1 550. In some embodiments, the set of processes 520 detects that ring 1 550 is empty when it detects that there are only default null values stored in each storage element of ring 1 550. In other embodiments, the set of processes 520 detects that ring 1 550 is empty when the ring is no longer associated with a flag that designated whether the ring stores a data message for retrieval. Other embodiments may use other techniques for detecting that a ring is empty.

Figure 5D:
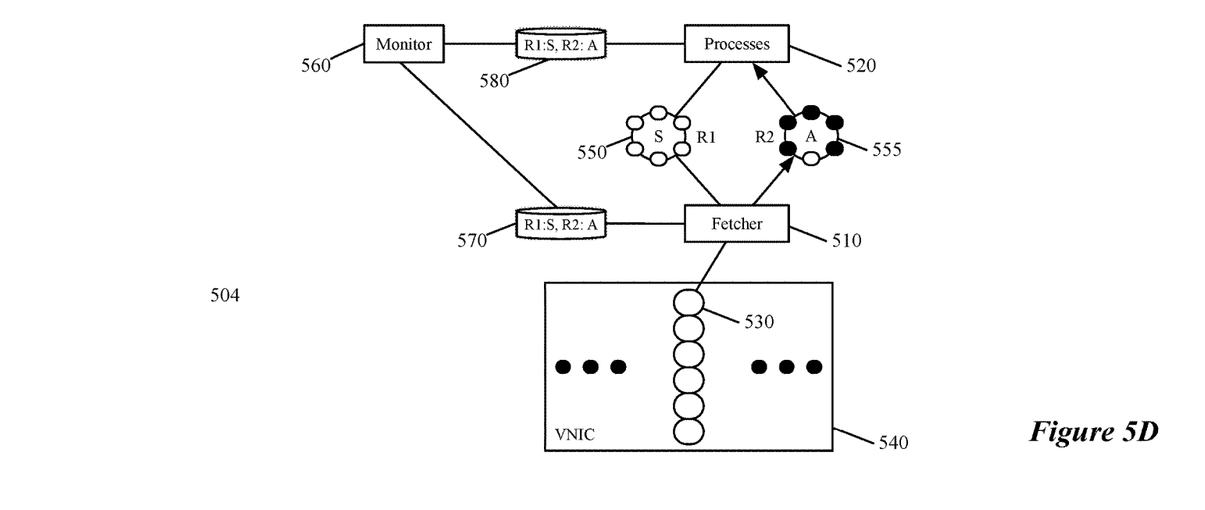

At the fourth stage 504 in FIG. 5D, ring 2 555, designated as the active ring, has reached its own threshold congestion level. This threshold level, in this example, is the point at which only one storage element in ring 2 555 is empty. In other embodiments, the threshold congestion level of ring 2 555 can be different. The threshold congestion level of ring 2 555 may be the same as or different from the threshold congestion level of ring 1 550 in different embodiments. Now the data fetcher 510 is unable to store any more data messages from the VNIC queue 530 in ring 2 555 without the ring exceeding its threshold congestion level. Because ring 1 550 is empty, the set of processes 520 is now able to start retrieving data messages from ring 2 555. While the monitor has detected that ring 2 555 has reached its threshold congestion level, it has not yet updated the data stores 570 and 580. Hence, Ring 1 550 is not storing data messages from the data fetcher 510 at this stage 504.

Figure 5E:
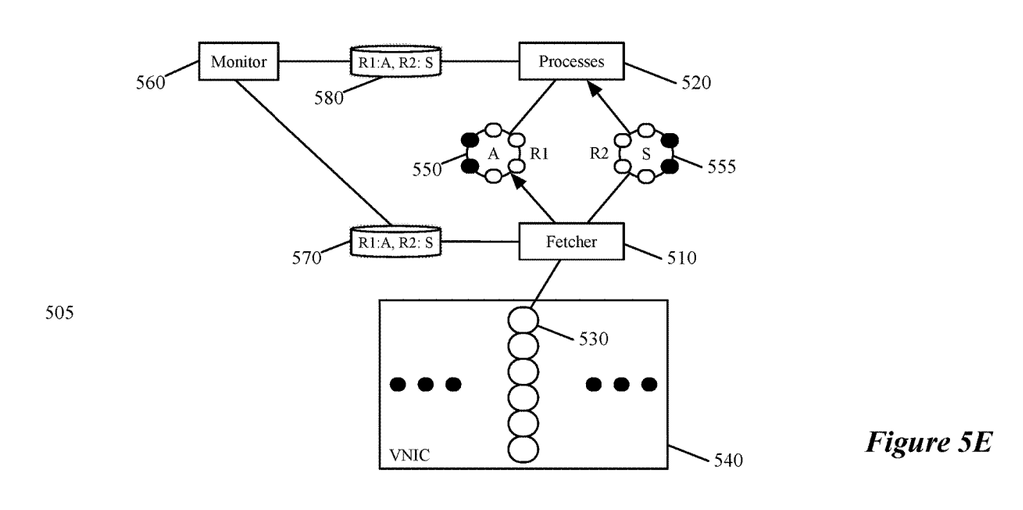

At the fifth stage 505 in FIG. 5E, ring 2 555 is now designated as the standby ring and ring 1 550 is now designated as the active ring, and the monitor 560 has recorded the new designation of the rings in the data stores 570 and 580. The data fetcher 510 detects the new designation of the rings from the data store 570 and is now storing data messages from the VNIC queue 530 in ring 1 550 again. The set of processes 520 detects the new designation of the rings from the data store 580 but does not start retrieving data messages from ring 1 550. At this stage 505, ring 2 555 is currently storing data messages in two of its storage elements. The set of processes 520 will not start retrieving data messages from ring 1 550 until ring 2 555 is empty, so the set of processes 520 continues to retrieve data messages from ring 2 555.

Figure 5F:
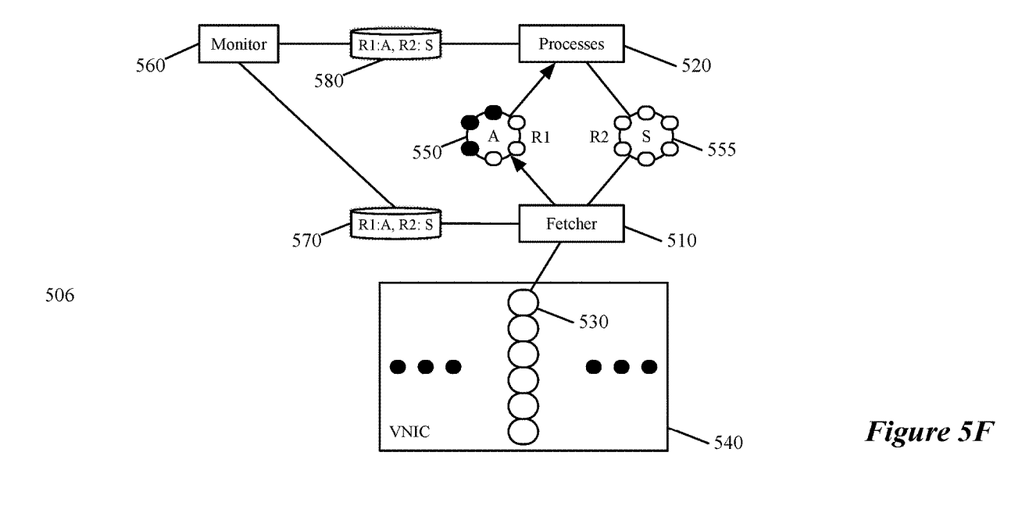

At the sixth and final stage 506 in FIG. 5F, ring 1 550 is still designated as the active ring and ring 2 555 is still designated as the standby ring, and the designation is monitored by the monitor 560 and stored in the data stores 570 and 580. The data fetcher 510 continues to store data messages from the VNIC queue 530 in ring 1 550. Because ring 2 555 is empty and is not storing any data messages from the data fetcher 510, the set of processes 520 retrieves data messages from ring 1 550 for processing. In some embodiments, the set of processes 520 detects that ring 2 555 is empty when it detects that there are only default null values stored in each storage element of ring 2 555.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
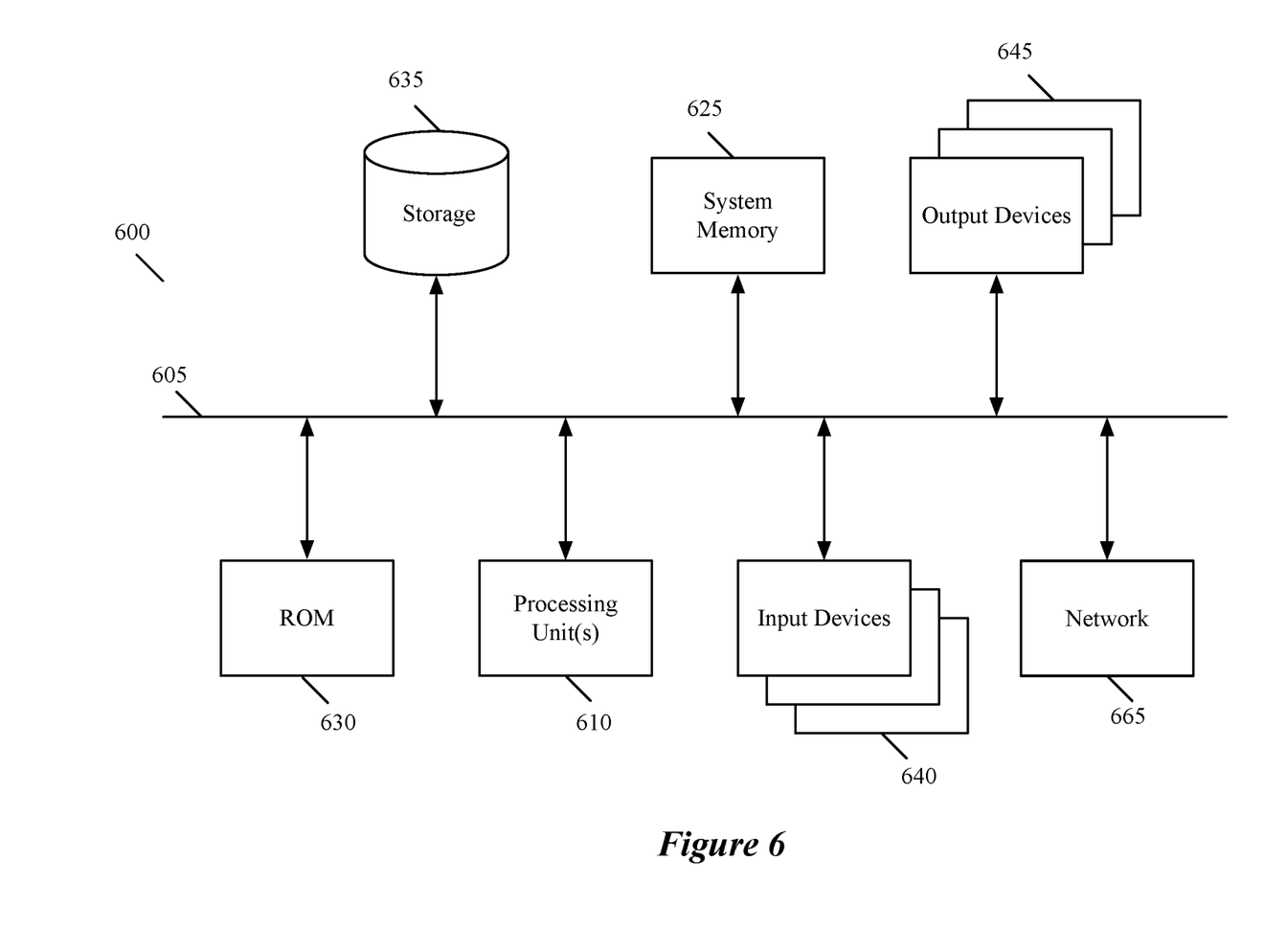
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described computers and servers. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described examples illustrate a VNIC associated with a single queue and a single active/standby ring pair. One of ordinary skill will realize that in some embodiments, the VNIC includes multiple queues that are each paired with a different active/standby ring pair that store data messages.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of forwarding data messages to a machine executing on a host computer, the machine having an associated virtual network interface controller (VNIC), the method comprising:

storing, in a first set of buffer data stores associated with the VNIC, a first plurality of data messages retrieved from a queue of the VNIC associated with the machine; and after the first set of buffer data stores reaches a threshold congestion level, storing, in a second set of buffer data stores associated with the VNIC, a second plurality of data messages retrieved from the VNIC queue, wherein:

a set of one or more processes executing on the machine retrieves the data messages from the first and second sets of buffer data stores; and when the first plurality of data messages is stored in the first set of buffer data stores, the buffer data stores of the first set are designated as active buffer data stores and the buffer data stores of the second set are designated as standby buffer data stores, and when the second plurality of data messages is stored in the second set of buffer data stores, the buffer data stores of the second set are designated as active buffer data stores and the buffer data stores of the first set are designated as standby buffer data stores.

2. The method of claim 1, wherein each set of buffer data stores is implemented by a ring of storage elements.

3. The method of claim 2, wherein each set of buffer data stores includes receiving (Rx) buffer data stores.

4. The method of claim 2, wherein each ring in the ring of storage elements comprises a sequence of locations in a memory to which data messages are sequentially stored with a first storage location in the sequence being a next storage location after each data message is stored in the last location.

5. The method of claim 4, wherein the memory is one of a volatile memory or a non-volatile storage.

6. The method of claim 1, wherein the threshold congestion level 1s a first threshold congestion level, the method further comprising:

after the second set of buffer data stores reaches a second threshold congestion level, storing, in the first set of buffer data stores associated with the VNIC, a third plurality of data messages retrieved from the VNIC queue, wherein the buffer data stores of the second set are now designated as standby buffer data stores and the buffer data stores of the first set are now designated as active buffer data stores.

7. The method of claim 6, wherein the first threshold congestion level and the second threshold congestion level are the same levels of congestion.

8. The method of claim 6, wherein the first threshold congestion level and the second threshold congestion level are different levels of congestion.

9. The method of claim 1, wherein the queue is a first queue and the threshold congestion level is a first threshold congestion level, the method further comprising:

storing, in a third set of buffer data stores associated with the VNIC, a third plurality of data messages retrieved from a second queue of the VNIC associated with the machine; and after the third set of buffer data stores reaches a second threshold congestion level, storing, in a fourth set of buffer data stores associated with the VNIC, a fourth plurality of data messages retrieved from the second VNIC queue, wherein the set of one or more processes executing on the machine retrieves the data messages from the third and fourth sets of buffer data stores.

10. The method of claim 1, wherein the queue is a first queue and the third and fourth sets of buffer data stores are associated with a second VNIC queue.

11. The method of claim 1, wherein the threshold congestion level is a maximum capacity of storage of the first set of buffer data stores.

12. The method of claim 1, wherein the first and second pluralities of data messages are retrieved from a port of a software switch external to the machine.

13. A non-transitory machine readable medium storing a program for execution by at least one processing unit, the program for forwarding data messages to a machine executing on a host computer, the machine having an associated virtual network interface controller (VNIC), the program comprising sets of instructions for:

storing, in a first set of buffer data stores associated with the VNIC, a first plurality of data messages retrieved from a queue of the VNIC associated with the machine; and after the first set of buffer data stores reaches a threshold congestion level, storing, in a second set of buffer data stores associated with the VNIC, a second plurality of data messages retrieved from the VNIC queue, wherein:

a set of one or more processes executing on the machine retrieves the data messages from the first and second sets of buffer data stores; and when the first plurality of data messages is stored in the first set of buffer data stores, the buffer data stores of the first set are designated as active buffer data stores and the buffer data stores of the second set are designated as standby buffer data stores, and when the second plurality of data messages is stored in the second set of buffer data stores, the buffer data stores of the second set are designated as active buffer data stores and the buffer data stores of the first set are designated as standby buffer data stores.

14. The non-transitory machine readable medium of claim 13, wherein the set of one or more processes comprises a set of one or more applications to process the first and second pluralities of data messages.

15. The non-transitory machine readable medium of claim 13, wherein the sets of buffer data stores are designated as active or standby by a set of instructions for maintaining a data store.

16. The non-transitory machine readable medium of claim 15, wherein storing the data messages retrieved from the VNIC queue and maintaining the data store are performed by different modules of a single program.

17. The non-transitory machine readable medium of claim 13, wherein the first and second sets of buffer data stores use First In, First Out (FIFO) logic.

18. The non-transitory machine readable medium of claim 13, wherein a first maximum capacity of storage of the first set of buffer data stores and a second maximum capacity of storage of the second set of buffer data stores are small.

* * * * *